W. S. Gale,
Piston Packing.

Nº 17,855. Patented July 21, 1857.

UNITED STATES PATENT OFFICE.

WM. S. GALE, OF NEW YORK, N. Y., ASSIGNOR TO PETER POILLON, OF SAME PLACE.

MEANS FOR RENDERING JOINTS STEAM-TIGHT.

Specification of Letters Patent No. 17,855, dated July 21, 1857.

*To all whom it may concern:*

Be it known that I, WILLIAM SULLIVAN GALE, of the city, county, and State of New York, have invented a certain new and useful invention or improvement which I call "Gale's Improved Means for Rendering Joints Steam-Tight," being a substitute for all known means of packing pistons or other steam-joints.

The following is a full and exact description of my invention.

It consists of a grooved or a corrugated surface with an opposing smooth or plain surface. For example you provide grooves on a piston or in a cylinder, as may be most convenient, or best adapted as may be seen in the accompanying drawing.

Figure 2:
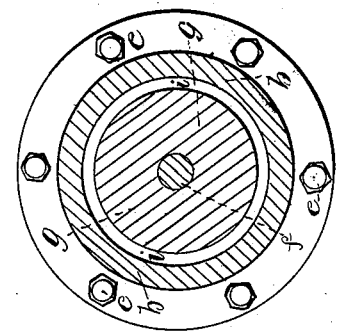
Figure 1:
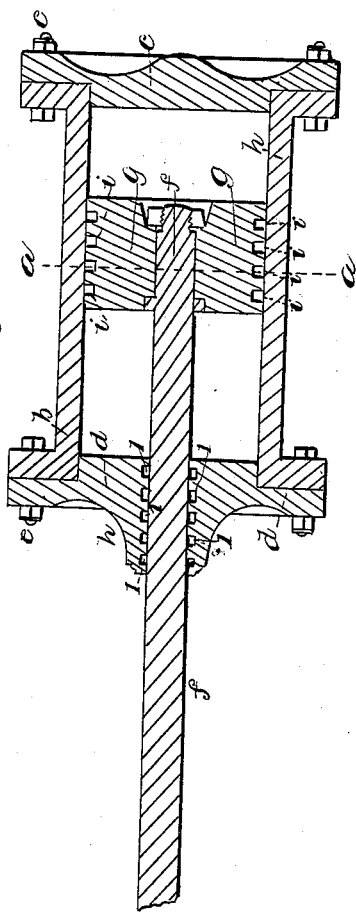

Figure 1 is a section of a piston and cylinder constructed according to my invention. Fig. 2 is a cross section as shown at the line *a, a*.

Similar letters of reference indicate corresponding parts in both figures.

*g* is a piston cut around with grooves *i, i, i, i;* *h* the opening through which the piston rod *f* passes in the head *d* of the cylinder, and presents another exemplification of my invention where the grooves are cut in the sides of the opening instead of being made on the piston rod. Like grooves might be made on the inside of the cylinder *b* and the piston left smooth. The steam as it is let into the cylinder rushes in between the piston and cylinder and fills up the grooves and the intervening space between the piston and cylinder where it practically forms a complete packing. The steam which fills the grooves and intervenes between the piston and cylinder also acts as a cushion to partially relieve the piston and cylinder from contact and friction. The grooves may be one or many at more or less distance apart, more or less wide or deep and they may be perpendicular or more or less oblique to the moving surface and of any sectional form. The best method is to groove one moving surface and leave the opposing surface smooth, to make the grooves thin and frequent, and the corresponding ribs or flanges of the same or about the same thickness as the width of the grooves. The grooves need not be deep. From one quarter to one half inch will answer. The piston can be of any ordinary size and dimensions now in use or a trifle longer. It should fit easy and does not require to be in actual contact with the cylinder. To cut the grooves perpendicular to the axis of the joint or to the moving surface, and in the sectional form of a parallelogram is the better way and sufficient for all purposes, and is the most simple and cheap in construction; see representation in the accompanying drawing.

It will be apparent that my grooves and intervening ribs may be used on any joint between two surfaces subject to the operation of steam under pressure, to cause steam to become self packing.

The particular point of my invention and discovery and its importance will be perceived from the following. Since the introduction of steam as a motive power it has always been supposed that two contiguous surfaces could only be rendered steam tight by actual contact, hence every steam engine that has heretofore been made has depended upon smooth surfaces in contact or else on some character of elastic packing that would set steam tight against its adjacent surface. To accomplish this, great varieties of metallic and other packings have been devised and vast expenses incurred to make the pistons and other moving joints steam tight, and this course has heretofore been universally pursued. I believe myself therefore to be the original and first inventor or discoverer of the fact that steam when introduced into small grooves in one of the contiguous surfaces will itself become a packing without said surfaces actually being in contact.

I however wish it to be understood that I do not claim the grooved surfaces in themselves as these have before been used for other purposes, and have been used in connection with air engines, but

What I claim as my invention or discovery and desire to secure by Letters Patent, is—

The method herein described of causing steam to become a packing to itself, in steam cylinders, or other parts of steam machinery, by allowing the steam to act in one or more grooves, substantially as specified.

WM. S. GALE.

Witnesses:
G. P. ANDREWS,
G. G. TAYLOR.